(No Model.)

P. GILLES & M. LINK.
VEHICLE HUB.

No. 310,576. Patented Jan. 13, 1885.

Witnesses.

Inventor
Peter Gilles
Michael Link
By Wm H. Lotz
Atty.

UNITED STATES PATENT OFFICE.

PETER GILLES AND MICHAEL LINK, OF KENOSHA, WISCONSIN.

VEHICLE-HUB.

SPECIFICATION forming part of Letters Patent No. 310,576, dated January 13, 1885.

Application filed April 9, 1884. (No model.)

*To all whom it may concern:*

Be it known that we, PETER GILLES, a subject of the Emperor of Germany, and MICHAEL LINK, a citizen of the United States, both of Kenosha, in the county of Kenosha and State of Wisconsin, have invented certain new and useful Improvements in Hubs for Vehicle-Wheels; and we do hereby declare that the following is a full, clear, and exact description thereof, reference being had to the accompanying drawings, and to the letters of reference marked thereon, which form a part of this specification.

Our invention relates to improvements in wheel-hubs, and more especially to the novel manner of securing the wheel-spokes thereto.

The object of the invention is to construct a cheap and simple hub, and one into which the spokes can be readily inserted and securely held; and to the accomplishment of the above the invention consists of the novel devices and combination of devices, as will be described and claimed.

Figure 1:
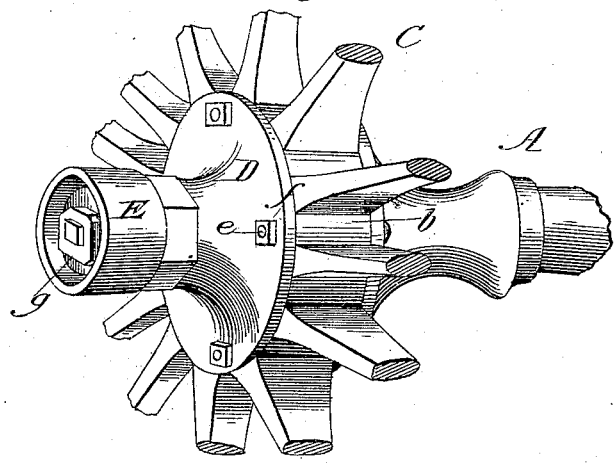
Figure 2:
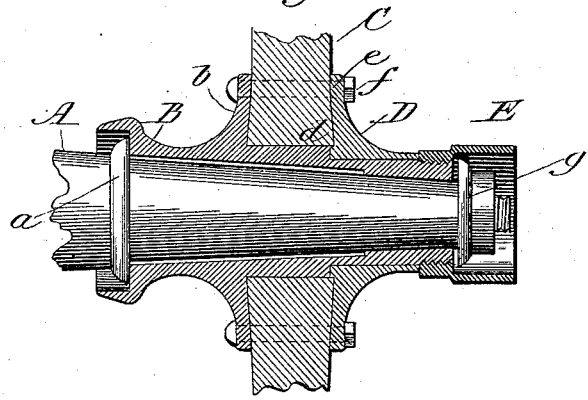
Figure 3:
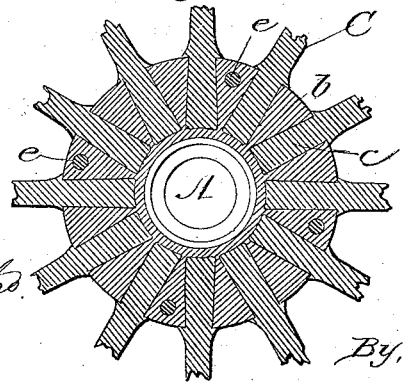

Reference will be made to the accompanying drawings, in which Figure 1 is a view in perspective of a hub with the axle and spokes broken away; Figs. 2 and 3, sectional views of the same.

Like letters refer to like parts in each view.

A represents the skein, which is inserted into box B, and is provided with collar $a$ to prevent its being inserted too far, said collar impinging against a shoulder formed upon the inner end of the box, as shown in Fig. 2.

Formed with box B is the raised portion $b$, which forms the hub proper, and in which a series of dovetail openings are formed for the reception of spokes C. The lower portion of each spoke is tapered to accommodate itself to the dovetail above referred to, as shown at $c$ in Fig. 3, and at its front and rear edges is tapered, as at $d$, Fig. 2, for the purpose hereinafter referred to. After the spokes have been inserted into the dovetail grooves, a collar, in the form of a plate or disk, D, is passed over the outer end of the box B, said plate being formed slightly on an incline in its inner face, to accommodate the taper $d$ of the spokes before referred to. The outer end of box B is screw-threaded, as shown in Fig. 2, and the disk D being in the proper position, an internally-screw-threaded cap or cover, E, is screwed onto the box, contacting at its inner end with said disk or collar D, and forcing it against the spokes to hold them securely in place. After cap E has been sufficiently tightened to hold the spokes in the proper position, bolts $e$ are passed through disk D and hub portion $b$, between the spokes, and a nut, $f$, screwed upon the protruding end of each, whereby the parts are all securely held in place. Upon its outer surface and inner end, cap E is preferably of an octagon shape, to afford a holding-surface of a wrench, and at the same time this cap covers the outer end of the skein upon which the nut $g$ is mounted. By providing the spokes with the tapers described, they are held securely in place from all sides, and by means of the bolts passed between the spokes all liability of parts being separated accidentally is avoided.

What we claim is—

The hub B $b$, provided with a series of dovetail grooves, in combination with spokes C, tapered on their lower ends, as at $c$ $d$, disk D, inclined upon its inner face, cap or collar E, and bolts $e$. passed through the disk and hub, as set forth.

In testimony that we claim the foregoing as our invention we affix our signatures in presence of two witnesses.

PETER GILLES.
    MICHAEL LINK.

Witnesses:
 NICHOLAS HUETTER,
 JAMES CAVANAGH.